United States Patent

[11] 3,554,406

[72] Inventor William K. Kleysteuber
 Wexford, Pa.
[21] Appl. No. 769,288
[22] Filed Oct. 21, 1968
[45] Patented Jan. 12, 1971
[73] Assignee United States Steel Corporation
 a corporation of Delaware

[54] ROTARY APPARATUS FOR FEEDING GRANULAR MATERIAL INTO AN EVACUATED RECEIVER
8 Claims, 2 Drawing Figs.

[52] U.S. Cl................................................. 222/30,
 222/370
[51] Int. Cl......................................................... B67d 5/24
[50] Field of Search........................................... 222/30,
 370, 264, 63, 254, 333, (Inquired); 141/48,
 59—61

[56] References Cited
UNITED STATES PATENTS
2,590,817 3/1952 Fenno........................... 222/333

2,907,357 10/1959 Sandhage et al.............. 141/59
3,195,776 7/1965 Helm et al. ................... 222/370X
3,360,094 12/1967 Romanowski................. 222/2X

*Primary Examiner*—Stanley H. Tollberg
*Attorney*—Walter P. Wood

ABSTRACT: Apparatus and method of controlling the flow rate of granular material into a receiver. The apparatus departs from the conventional paddle-type of apparatus for regulating flow. Instead, a rotating wheel with recesses is employed, whereby material falls from a hopper into the recesses of the wheel, one recess at a time, and is carried by these recesses to a discharge position above the material receiver. Means are provided for counting the number of recesses discharging material into the receiver, and according to the method, an operator noting the rate of such discharging can increase or decrease the speed of the wheel. A vacuumtight chamber may be provided for housing the wheel, so that the apparatus can be used to feed material into an evacuated vessel.

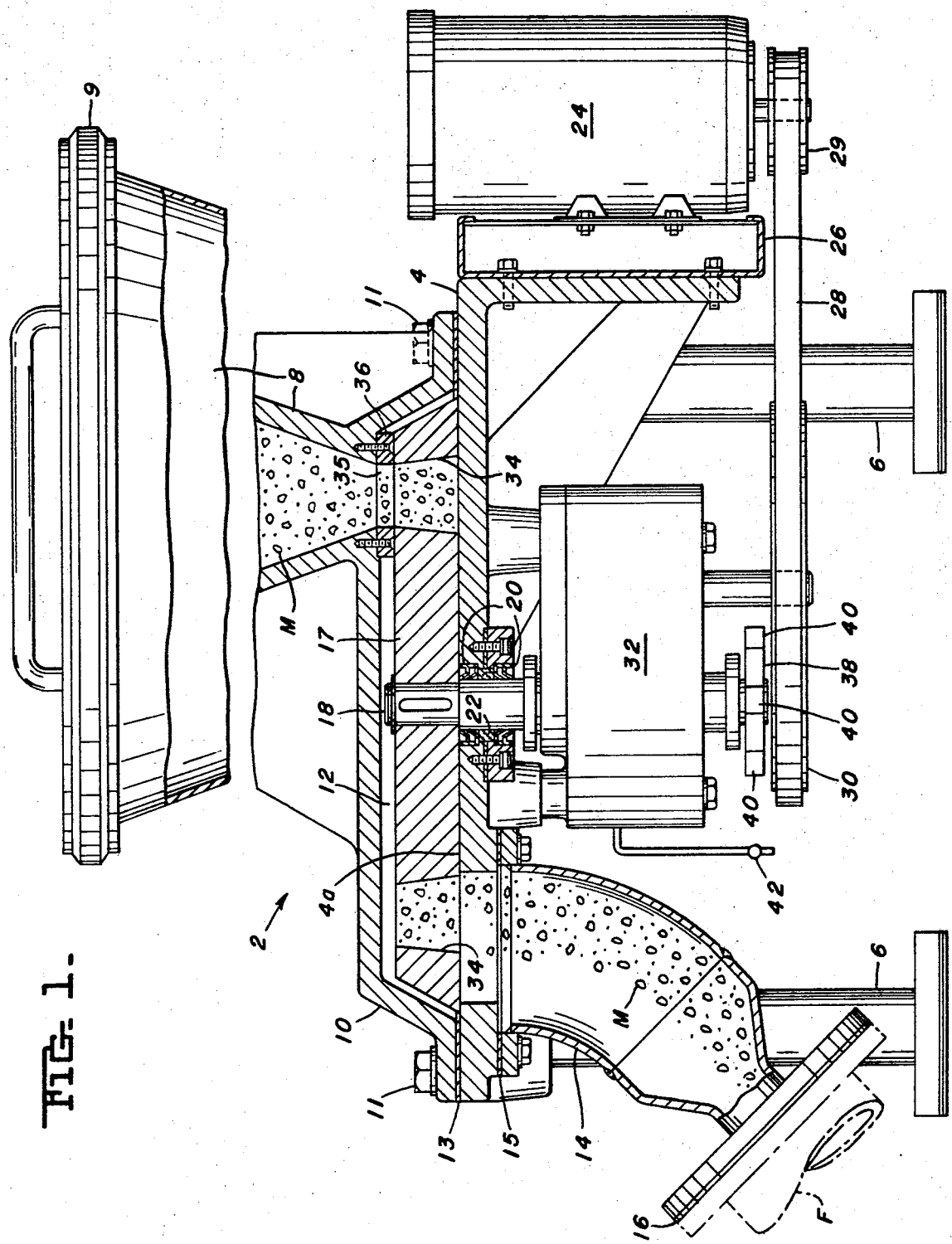

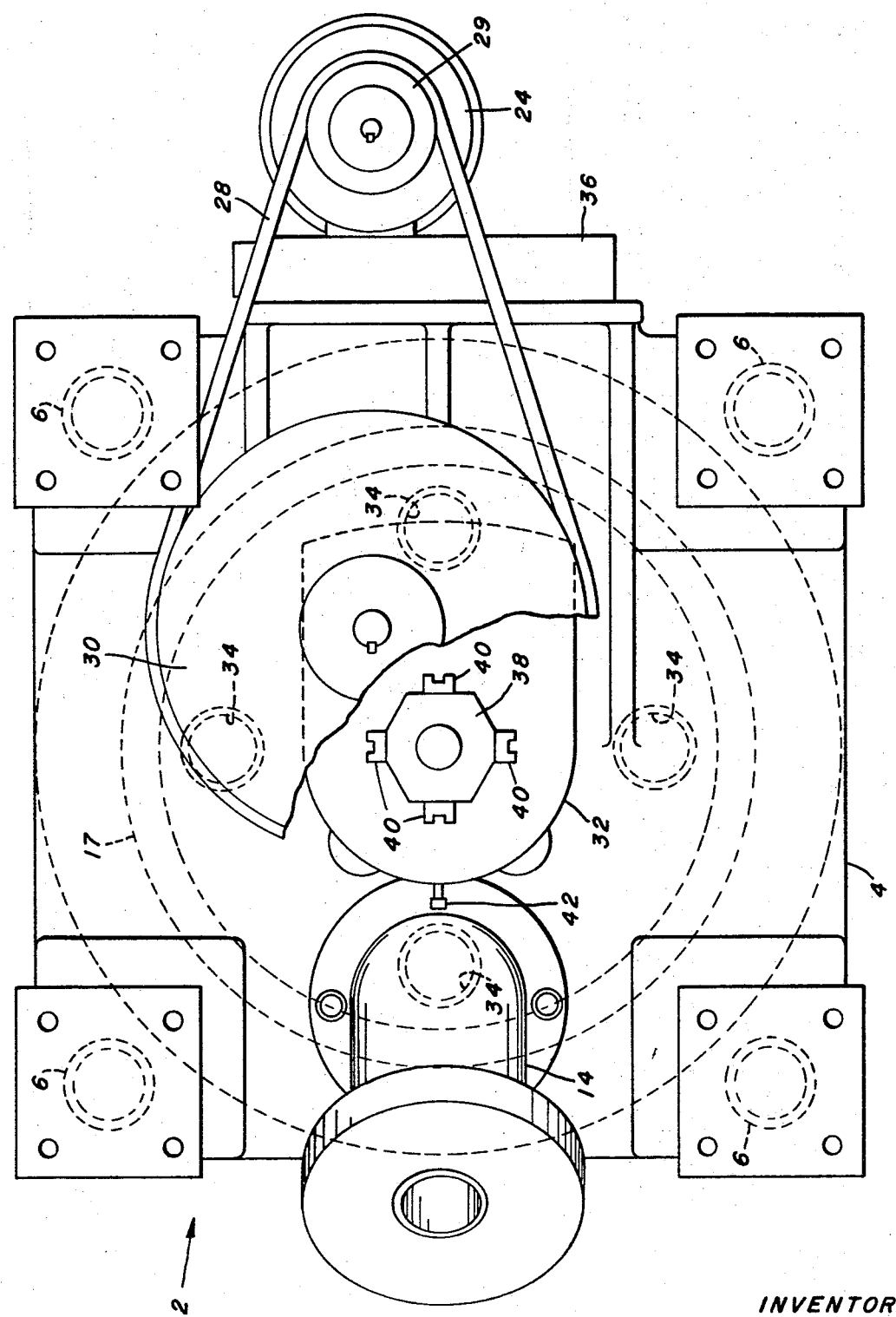

ROTARY APPARATUS FOR FEEDING GRANULAR MATERIAL INTO AN EVACUATED RECEIVER

This invention relates to apparatus and a method of feeding granular materials at a controlled rate into a receiver. One application of the apparatus is in the feeding of granular materials into a vacuum degassing vessel used in steelmaking.

A common type of apparatus used for regulating the flow of granular materials has been a rotating paddle wheel, placed below the bottom opening of the hopper in which the material is stored. The speed of the paddle wheel determines the speed at which the material discharges from the hopper. One serious difficulty with such apparatus is that the ends of the paddles wear off, due to abrasive action of the granular material moving over it. As the ends wear off, the paddle becomes ineffective for regulating the material flow.

Another type of feeding apparatus is a rotating horizontal turntable placed beneath a hopper. Material flows from the hopper onto the top surface of the turntable near its periphery. On the opposite side of the turntable from the hopper, a vertical plate diverts the material from the turntable into its receiver. The rate of material falling into the receiver can be adjusted by changing the speed of the turntable. However, the rate can be controlled only approximately, since the material on the top of the turntable is not confined and is spread unevenly. Also, there is no known way of measuring the exact amount of the material carried by the turntable, and thus the operator must guess at the approximate discharge rate of material into the receiver.

An object of my invention, is to provide apparatus for controlling the flow rate of granular material that will provide an accurate means of determining how fast the material is flowing, and an accurate control for maintaining and adjusting the material flow rate.

Another object of my invention is to provide apparatus for controlling the flow rate of granular material that will not be subject to excessive wear due to the abrasive action of the material granules.

Still another object of my invention is to provide a method of feeding granular material at a controlled rate which will enable an operator to make accurate and quick adjustments to achieve the desired rate of flow.

These and other objects will be more apparent from the following detailed description of my invention and the attached drawings in which:

FIG. 1 is a side elevation of apparatus for controlling the flow rate of granular materials, with parts broken away; and FIG. 2 is a bottom view of the apparatus of FIG. 1, with parts broken away.

Referring to FIG. 1, material flow control apparatus 2 includes a base 4 with four legs 6. A hopper 8 is positioned on top of the base 4 and holds granular material M. The hopper has a gastight cover 9, which is removed only when more material M is to be added.

A plate 10 is cast integral with the bottom of hopper 8 and is secured to the base 4 by bolts 11. The plate 10 and base 4 together form a chamber 12, which is maintained gastight by a gasket 13 between the juxtaposed surfaces of plate 10 and base 4.

A material receiver in the form of pipe 14 extends downwardly from the underside of base 4. In the present embodiment, the bottom end of pipe 14 is designed to be connected to the additive feed pipe F of a vacuum degassing vessel. Gaskets 15 and 16 provide gastight connections at both ends of the pipe 14.

A rotatable wheel 17 is housed within the chamber 12 and rests on flat surface 4a of base 4. The wheel 17 is fixed to shaft 18, which is journaled in bushings 20 of base 4. A grease packing 22 between the bushings 20 prevents gas leakage into the chamber 12. The shaft 18 and wheel 17 are driven by a variable speed motor 24, mounted by a bracket attachment 26 on the right side of base 4. V-belt 28, pulleys 29 and 30, and gear reducer 32 provide the drive connection between the motor 24 and shaft 18.

The wheel 17 has a plurality of recesses in the form of holes 34, with sidewalls that diverge from top to bottom. In the embodiment shown, there are four holes 34, and they are preferably spaced evenly around the wheel 17, as shown by dotted lines in FIG. 2.

As the wheel 17 rotates, each hole 34 becomes aligned, one by one, with bottom opening 35 in hopper 8. Also, the bottom of each hole 34 becomes aligned, one by one, with the top of receiving pipe 14. An annular plate 36 fixed around the bottom opening of hopper 8 slidably engages the top surface of wheel 17 to prevent material from escaping from the hopper 8 onto the top of the wheel. Also, material is kept from flowing out of the bottoms of holes 34 by engagement of wheel 17 with flat surface 4a of base 4.

A disc 38 is mounted on the bottom of shaft 18, underneath the gear reducer 32. Permanent magnets 40 on the periphery of disc 38 are located in radial alignment with each hole 34 in the wheel 17. A reed switch 42 is suspended from the gear reducer 32. The reed switch is located horizontally adjacent to the disc 38 and is aligned between the axis of shaft 18 and the center line of receiving pipe 14. Each time a hole 34 passes over the top of pipe 14, a magnet 40 on disc 38 passes by the reed switch 42. The reed switch senses the magnetic field and records the event on a digital counting device, not shown. A suitable reed switch is model MRG 2-185, made by Hamlin Manufacturing Company of Lake Mills, Wisconsin.

In operation, the lower end of receiving pipe 14 is bolted securely to the additive feed line F of a vacuum degassing vessel. Wheel 17 is rotated to a position in which holes 34 are neither aligned with receiving pipe 14 nor the bottom opening 35 in hopper 8. Top and bottom surfaces of wheel 17 engage the annular plate 36 and base surface 4a respectively, and these interfaces are a substantial barrier to the passage of air. Thus, when cover 9 of the hopper 8 is removed to fill the hopper, there will be little chance for air to leak into degassing vessel through the apparatus 2.

After the hopper 8 has been filled, the cover 9 is replaced. Then, the operator starts the motor 24 to rotate the wheel 17. As each hole 34 passes beneath the bottom opening in hopper 8, it is filled with material M. On the other side of apparatus 2, holes 34 filled with material M pass over the receiving pipe 14. The material falls into receiving pipe 14, and the diverging walls of the hole 34 allow the material M to fall without sticking. Simultaneously, one of the magnets 40 on disc 38 activates the reed switch 42, which causes a digital counter to record the discharge event. The digit counter thus keeps track of the rate at which holes 34 are discharging material M through the receiving pipe 14, and the operator can increase or decrease the speed of the motor 24 to achieve a desired flow rate. The amount of material that is fed through the receiving pipe 14 can be easily calculated by multiplying the volume of each hole 34 by the number of discharges recorded on the digital counting device by the reed switch 42.

The flow rate of material M fed by the apparatus 2 can be adjusted closely. When only small amounts of material M are needed, the wheel 17 may run at well under one revolution per minute. In fact, the motor 24 may be turned on to cause the material from one hole 34 to discharge through receiving pipe 14, and then the motor can be turned off.

On the other hand, the wheel 17 may rotate at speeds up to 15 to 20 revolutions per minute. Higher speeds will result in the holes 34 not filling up as they pass under bottom opening 35 of hopper 8. However, this maximum allowable speed of wheel 17 may be increased by making the hopper opening 35 oblong, or in the shape of an arcuate slot. Also, the maximum flow rate of the apparatus may be increased by providing more holes 34 in the wheel 17.

I claim:

1. Apparatus for feeding granular material into an evacuated receiver, said apparatus comprising:
   a base;
   a material storage hopper mounted on said base and having a discharge opening;
   a gastight cover on said hopper;

a wheel rotatably mounted on said base, said wheel having a recess which communicates with said discharge opening at a first position or rotation of said wheel, and with said receiver at a second position of rotation of said wheel;

a gastight chamber on said base housing said wheel and having substantially gastight connections with said hopper and said receiver;

means connected with said wheel for rotating it; and means mounted on said base and engaging said wheel for holding material in said recess as said recess moves from a position communicating with said discharge opening to a position communicating with said receiver.

2. Apparatus of claim 1, wherein said wheel has a plurality of recesses, and the apparatus includes means connected to said wheel for recording each passage of each of said recesses through said second position in the rotation of said wheel.

3. Apparatus of claim 1, wherein said means for rotating said wheel is adjustable to change the speed of the wheel.

4. Apparatus of claim 1 wherein:

said wheel is rotatably mounted above a vertical axis and has a top side and a bottom side;

the recess of said wheel is a hole extending from the top side to the bottom side of said wheel, said hole being in communication at the top side of said wheel with said discharge opening in said hopper when said wheel is at said first position in its rotation, said hole being in communication at the bottom side of said wheel with said receiver when said wheel is at said second position in its rotation; and said means engaging said wheel is a platform mounted on said base beneath the path described by said hole at the bottom side of said wheel when said wheel passes from said first position to said second position in its rotation.

5. Apparatus of claim 4 wherein said wheel has more than one recess as described, and the apparatus includes means connected to said wheel for recording each passage of each of said recess through said second position in the rotation of said wheel.

6. Apparatus of claim 5, wherein said means for rotating said wheel is adjustable to change the speed of the wheel.

7. Apparatus of claim 1, including, means connected to said wheel for recording each passage of said recess through said second position in the rotation of said wheel.

8. Apparatus of claim 7, wherein said means for rotating said wheel is adjustable to change the speed of the wheel.